United States Patent
Yoakum

(10) Patent No.: US 10,205,624 B2
(45) Date of Patent: Feb. 12, 2019

(54) BANDWIDTH-EFFICIENT ARCHIVING OF REAL-TIME INTERACTIVE FLOWS, AND RELATED METHODS, SYSTEMS, AND COMPUTER-READABLE MEDIA

(71) Applicant: Avaya Inc., Basking Ridge, NJ (US)

(72) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 740 days.

(21) Appl. No.: 13/912,520

(22) Filed: Jun. 7, 2013

(65) Prior Publication Data

US 2014/0365676 A1    Dec. 11, 2014

(51) Int. Cl.
*H04L 29/06*    (2006.01)

(52) U.S. Cl.
CPC ...... *H04L 29/06469* (2013.01); *H04L 65/604* (2013.01); *H04L 65/607* (2013.01); *H04L 65/608* (2013.01); *H04L 65/601* (2013.01)

(58) Field of Classification Search
CPC .......... H04L 29/06469; H04L 65/4076; H04L 67/104; H04L 67/1063; H04L 45/02;
(Continued)

(56) References Cited

U.S. PATENT DOCUMENTS 6,714,967 B1    3/2004  Horvitz
7,107,316 B2    9/2006  Brown et al.
(Continued)

FOREIGN PATENT DOCUMENTS

EP    1615386 A1    1/2006
EP    2529316 A2    12/2012
(Continued)

OTHER PUBLICATIONS

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

(Continued)

*Primary Examiner* — Philip J Chea
*Assistant Examiner* — Mohammed Ahmed
(74) *Attorney, Agent, or Firm* — Sheridan Ross P.C.

(57) ABSTRACT

Bandwidth-efficient archiving of real-time interactive flows is disclosed herein. Related methods, systems, and computer-readable media are also disclosed. In this regard, in one embodiment, a method for archiving a real-time interactive flow is provided. The method comprises receiving, by a computing device, a real-time interactive flow, and forking the real-time interactive flow at the computing device as an archival stream. The method also comprises streaming the archival stream from the computing device to an archival repository at an adjustable streaming rate. The method additionally comprises measuring a change in a performance characteristic of the real-time interactive flow, and modifying the adjustable streaming rate based on the change in the performance characteristic of the real-time interactive flow. In this manner, a real-time interactive flow may be duplicated in a bandwidth-sensitive fashion while capturing a high-quality archive of the real-time interactive flow.

20 Claims, 7 Drawing Sheets

(58) Field of Classification Search
CPC ............ H04L 65/1006; H04L 65/1069; H04L 65/103; H04L 65/80; H04L 69/24; H04N 21/2225; H04N 21/23439; H04N 21/2747; H04N 21/8456; H04N 21/8549; H04N 21/2662; H04N 21/2393; H04N 21/274; H04N 21/266; G06F 9/461
USPC ........................................................ 709/231
See application file for complete search history.

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2002/0159464 A1* | 10/2002 | Lewis ............... H04L 29/06027 370/401 |
| 2002/0161685 A1* | 10/2002 | Dwinnell ............... G06Q 40/06 705/36 R |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1* | 10/2004 | Horoszowski .... G06F 17/30796 725/145 |
| 2005/0084082 A1 | 4/2005 | Horvitz et al. |
| 2005/0177380 A1 | 8/2005 | Pritchard et al. |
| 2006/0104526 A1* | 5/2006 | Gringeler ............... H04N 19/40 382/239 |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0078768 A1* | 4/2007 | Dawson ............... H04N 7/17318 705/50 |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0133767 A1* | 6/2008 | Birrer ............... H04L 65/4076 709/231 |
| 2008/0162642 A1 | 7/2008 | Bachiri et al. |
| 2008/0192646 A1 | 8/2008 | Song et al. |
| 2008/0270541 A1* | 10/2008 | Keener ............... H04N 7/15 709/206 |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1* | 5/2010 | Blum ............... H04L 41/0816 370/232 |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2011/0246922 A1* | 10/2011 | Koenig ............... G06F 9/461 715/771 |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2012/0268553 A1* | 10/2012 | Talukder ............... H04L 12/1818 348/14.08 |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1* | 5/2013 | Bulava ............... H04L 65/608 709/231 |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1* | 4/2014 | Carey ............... H04N 21/2187 709/233 |
| 2014/0108594 A1 | 4/2014 | Siegel et al. |
| 2014/0126708 A1 | 5/2014 | Sayko |
| 2014/0126714 A1* | 5/2014 | Sayko ............... H04M 3/5191 379/265.09 |
| 2014/0126715 A1* | 5/2014 | Lum ............... H04M 3/5133 379/265.09 |
| 2014/0143823 A1* | 5/2014 | Manchester ........ H04L 65/4084 725/116 |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 | 8/2014 | Santhanam et al. |
| 2014/0222894 A1 | 8/2014 | Gangadharan et al. |
| 2014/0222930 A1 | 8/2014 | Gangadharan et al. |
| 2014/0223452 A1 | 8/2014 | Santhanam et al. |
| 2014/0237057 A1 | 8/2014 | Khodorenko |
| 2014/0241215 A1 | 8/2014 | Massover et al. |
| 2014/0245143 A1 | 8/2014 | Saint-Marc |
| 2014/0258822 A1 | 9/2014 | Li et al. |
| 2014/0269326 A1* | 9/2014 | Westin ............... H04L 47/24 370/237 |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1* | 9/2014 | Casey ............... H04N 21/2225 725/93 |
| 2014/0282903 A1 | 9/2014 | Singh et al. |
| 2014/0289420 A1* | 9/2014 | Tarricone ............... H04L 45/02 709/227 |
| 2014/0324979 A1 | 10/2014 | Gao et al. |
| 2014/0325078 A1 | 10/2014 | Shan et al. |
| 2014/0344169 A1 | 11/2014 | Phelps et al. |
| 2014/0348044 A1 | 11/2014 | Narayanan et al. |
| 2014/0365676 A1* | 12/2014 | Yoakum ............ H04L 29/06469 709/231 |
| 2014/0379931 A1 | 12/2014 | Gaviria |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1 | 2/2015 | Pastro |
| 2015/0039687 A1 | 2/2015 | Waxman et al. |

(56) References Cited

U.S. PATENT DOCUMENTS

| | | |
|---|---|---|
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/DesignIssues/CloudStorage. html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_ WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, dated Sep. 12, 2014, 15 pages.
Notice of Allowance for U.S. Appl. No. 13/931,968, dated Mar. 23, 2015, 7 pages.
Final Office Action for U.S. Appl. No. 13/835,913, dated Mar. 26, 2015, 17 pages.
Final Office Action for U.S. Appl. No. 14/037,440, dated Feb. 11, 2015, 19 pages.
Non-Final Office Action for U.S. Appl. No. 14/068,839, dated Feb. 20, 2015, 15 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 dated Mar. 14, 2014, 3 pages.
Search Report for British patent application GB1317122.8 dated Mar. 11, 2014, 3 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, dated Apr. 24, 2015, 4 pages.
Advisory Action for U.S. Appl. No. 14/037,440, dated May 20, 2015, 3 pages.
Search Report for British Patent Application GB1419338.7, dated Apr. 27, 2015, 4 pages.
Search Report for British Patent Application GB1419334.6, dated Apr. 28, 2015, 6 pages.
Notice of Allowance for U.S. Appl. No. 13/944,368, dated Apr. 1, 2015, 8 pages.
Non-Final Office Action for U.S. Appl. 13/931,967, dated May 5, 2015, 10 pages.
Non-Final Office Action for U.S. Appl. No. 13/931,970, dated May 7, 2015, 9 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 dated Dec. 30, 2014, 4 pages.
Search Report for British patent application GB1411580.2 dated Dec. 30, 2014, 4 pages.
Non-Final Office Action for U.S. Appl. No. 13/931,968, dated Dec. 8, 2014, 6 pages.
Non-Final Office Action for U.S. Appl. No. 13/835,913, dated Nov. 20, 2014, 15 pages.
Non-Final Office Action for U.S. Appl. No. 13/803,292, dated Jan. 27, 2015, 13 pages.
Non-Final Office Action for U.S. Appl. No. 14/050,891, dated Jan. 29, 2015, 9 pages.
Non-Final Office Action for U.S. Appl. No. 13/955,023, dated Feb. 2, 2015, 12 pages.
Examination Report for British Patent Application GB1411584.4, dated Aug. 21, 2015, 1 page.

(56) References Cited

OTHER PUBLICATIONS

Examination Report for British Patent Application GB1411580.2, dated Aug. 21, 2015, 1 page.
Notification of Reasons for Refusal for Japanese Patent Application 2013-201221, dated Aug. 25, 2015, 8 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Non-Final Office Action for U.S. Appl. No. 14/141,798, dated Jul. 17, 2015, 13 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Extended European Search Report for European Patent Application 15161452.6, dated Jun. 23, 2015, 5 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, dated Sep. 3, 2015, 19 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Final Office Action for U.S. Appl. No. 14/141,798, dated Dec. 24, 2015, 10 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.
Search Report for British Patent Application No. GB1423089.0, dated Jul. 6, 2015, 4 pages.

\* cited by examiner

BANDWIDTH-EFFICIENT ARCHIVING OF REAL-TIME INTERACTIVE FLOWS, AND RELATED METHODS, SYSTEMS, AND COMPUTER-READABLE MEDIA

BACKGROUND

Field of the Disclosure

The technology of the disclosure relates generally to archiving real-time interactive flows.

Technical Background

Various network protocols, such as Web Real-Time Communications (WebRTC) protocol, Session Initiation Protocol (SIP), and H.323, provide capabilities for establishing real-time interactive flows via the Internet and/or a private network, such as an enterprise network. Such real-time interactive flows may include real-time video, audio, and/or data streams exchanged in point-to-point interactive sessions. Endpoints for the real-time interactive flows may be, for example, two or more web browsers and/or other purpose-built applications or communications clients. In this manner, real-time interactive flows facilitate communications and collaboration among users who may be remote from one another.

The use of real-time interactive flows in some environments may require recording of the real-time interactive flows. For instance, enterprise policies may dictate that real-time interactive flows transmitted across an enterprise network be recorded for security, legal, and/or archival purposes. However, recording the real-time interactive flows may be problematic in such environments. Due to the topology of a typical real-time interactive flow session, use of a central media element on the network between the endpoints to record the real-time interactive flow may not be practicable or desirable. As non-limiting examples, the real-time interactive flow may pass directly from one endpoint to the other, thus bypassing the central media element, or the real-time interactive flow may be encrypted and therefore inaccessible to the central media element. Moreover, duplicating, or "forking," the real-time interactive flow at one endpoint may put an undue burden on network bandwidth for the duplicated real-time interactive flow, or may degrade the quality of the real-time interactive flow.

SUMMARY OF THE DETAILED DESCRIPTION

Embodiments disclosed in the detailed description provide bandwidth-efficient archiving of real-time interactive flows. Related methods, systems, and computer-readable media are also disclosed. In this regard, in one embodiment, a method for archiving a real-time interactive flow is provided. The method comprises receiving, by a computing device (e.g., a purpose-built communications device), a real-time interactive flow. As used herein, a "real-time interactive flow" refers to an interactive media flow and/or an interactive data flow between or among two or more endpoints, comprising a real-time audio stream and/or a real-time video stream or other real-time media or data stream. The method further comprises forking the real-time interactive flow at the computing device as an archival stream. The method also comprises streaming the archival stream from the computing device to an archival repository at an adjustable streaming rate. The method additionally comprises measuring a change in a performance characteristic of the real-time interactive flow. The method further comprises modifying the adjustable streaming rate based on the change in the performance characteristic of the real-time interactive flow. In this manner, a real-time interactive flow may be duplicated in a bandwidth-sensitive fashion while capturing a high-quality archive of the real-time interactive flow.

In another embodiment, a system for archiving a real-time interactive flow is provided. The system comprises at least one communications interface, and an archival repository associated with the at least one communications interface. The system further comprises a computing device associated with the at least one communications interface and comprising an interactive flow functionality provider and an archival streaming agent. The interactive flow functionality provider is configured to receive a real-time interactive flow, and fork the real-time interactive flow to the archival streaming agent as an archival stream. The archival streaming agent is configured to stream the archival stream to the archival repository at an adjustable streaming rate. The archival streaming agent is further configured to measure a change in a performance characteristic of the real-time interactive flow. The archival streaming agent is also configured to modify the adjustable streaming rate based on the change in the performance characteristic of the real-time interactive flow.

In another embodiment, a non-transitory computer-readable medium is provided. The non-transitory computer-readable medium has stored thereon computer-executable instructions to cause a processor to implement a method comprising receiving, by a computing device, a real-time interactive flow. The method implemented by the computer-executable instructions further comprises forking the real-time interactive flow at the computing device as an archival stream. The method implemented by the computer-executable instructions also comprises streaming the archival stream from the computing device to an archival repository at an adjustable streaming rate. The method implemented by the computer-executable instructions additionally comprises measuring a change in a performance characteristic of the real-time interactive flow. The method implemented by the computer-executable instructions further comprises modifying the adjustable streaming rate based on the change in the performance characteristic of the real-time interactive flow.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
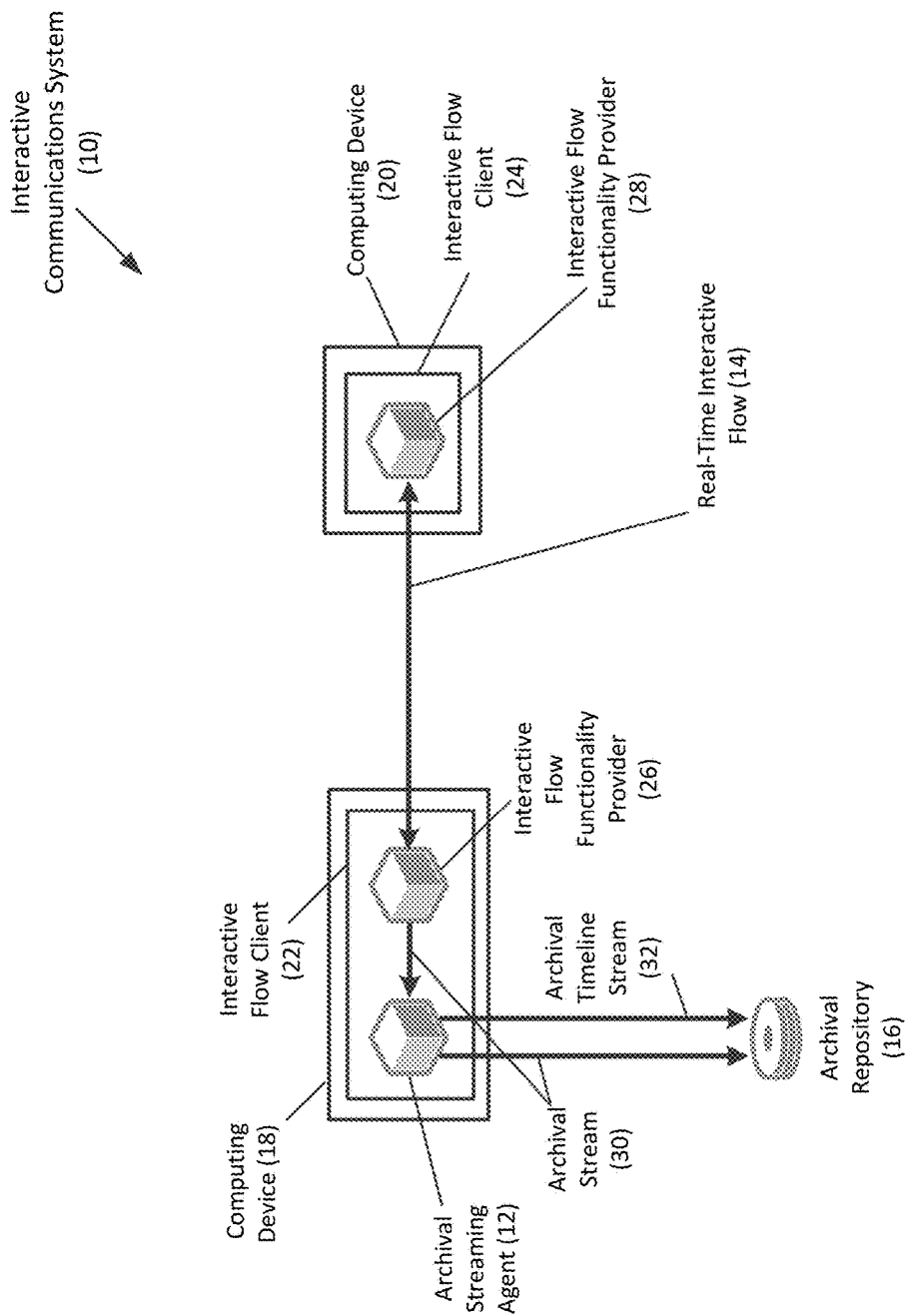
FIG. 1 is a conceptual diagram showing an exemplary topology of a real-time interactive flow, including a computing device comprising an archival streaming agent configured to provide bandwidth-efficient archiving of the real-time interactive flow.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide bandwidth-efficient archiving of real-time interactive flows. Related methods, systems, and computer-readable media are also disclosed. In this regard, in one embodiment, a method for archiving a real-time interactive flow is provided. The method comprises receiving, by a computing device, a real-time interactive flow. The method further comprises forking the real-time interactive flow at the computing device as an archival stream. The method also comprises streaming the archival stream from the computing device to an archival repository at an adjustable streaming rate. The method additionally comprises measuring a change in a performance characteristic of the real-time interactive flow. The method further comprises modifying the adjustable streaming rate based on the change in the performance characteristic of the real-time interactive flow. In this manner, a real-time interactive flow may be duplicated in a bandwidth-sensitive fashion while capturing a high-quality archive of the real-time interactive flow.

Figure 2:
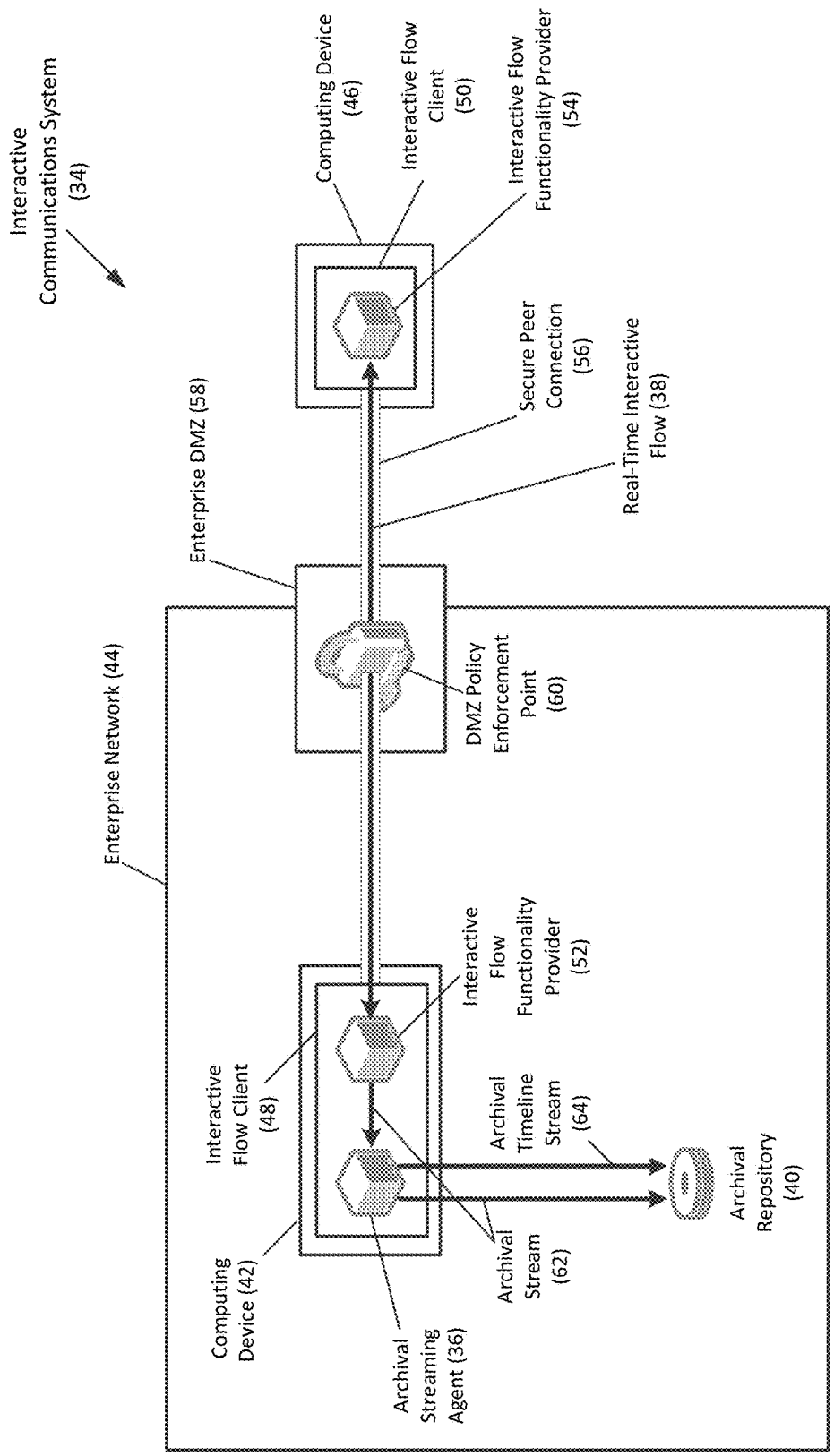
FIG. 2 is a conceptual diagram showing an exemplary topology of a real-time interactive flow across an enterprise network, including an archival streaming agent.
Figure 3:
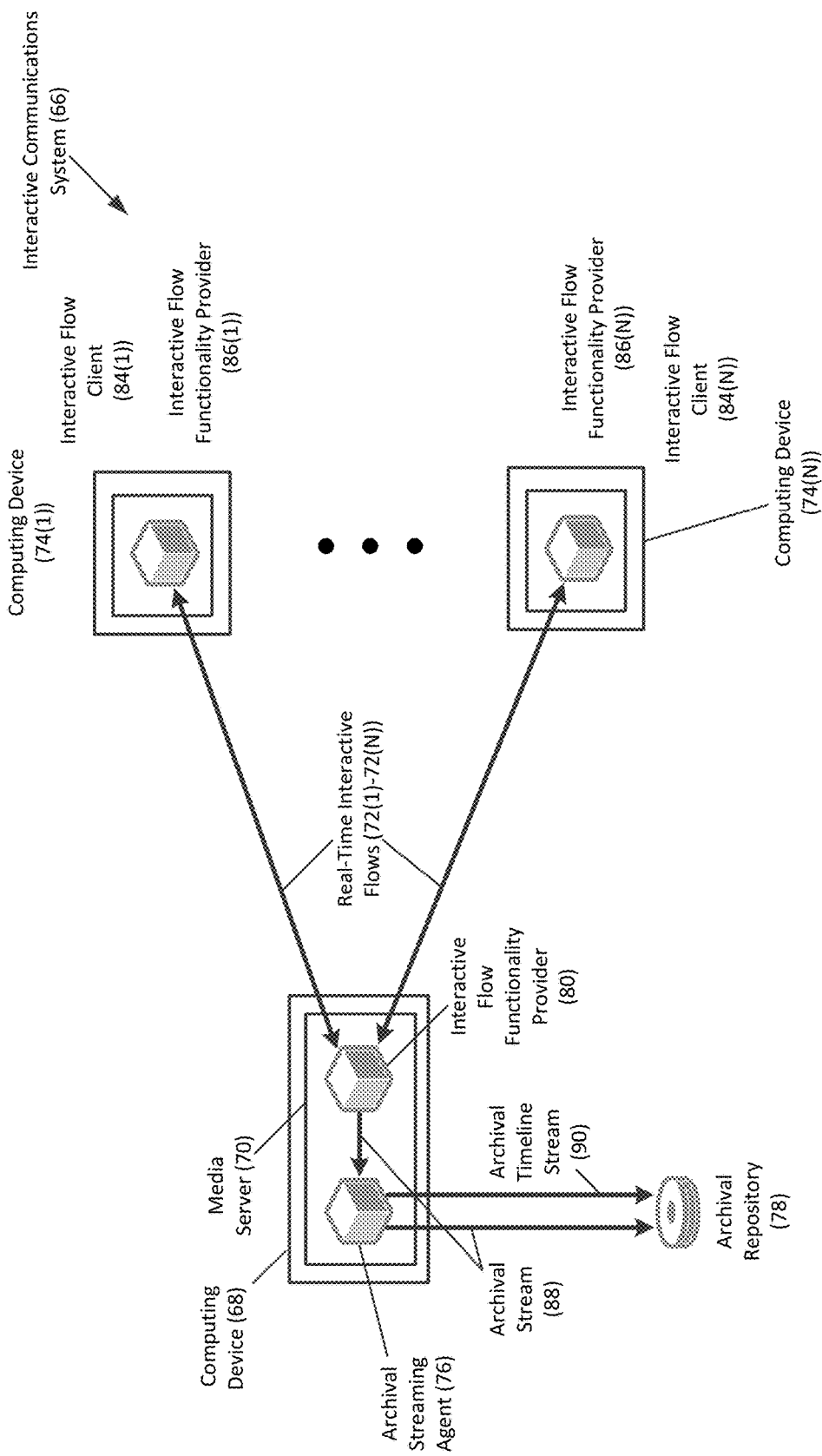
FIG. 3 is a conceptual diagram showing an exemplary topology of a real-time interactive flow, including a media server computing device incorporating an archival streaming agent.

In this regard, FIGS. 1-3 are provided to illustrate exemplary scenarios in which an archival streaming agent may provide bandwidth-sensitive archiving of real-time interactive flows. FIG. 1 shows an exemplary interactive flow between two endpoints, wherein the bandwidth-sensitive archiving is provided by an archival streaming agent at one endpoint. FIG. 2 illustrates archiving an interactive flow passing across an enterprise network. FIG. 3 provides an illustration of an archival streaming agent incorporated into a media server computing device. Each scenario is described in greater detail below.

Referring now to FIG. 1, an exemplary interactive communications system 10, including an archival streaming agent 12, provides bandwidth-sensitive archiving of real-time interactive flows. The archival streaming agent 12 provides a point at which a real-time interactive flow 14 may be streamed at an adjustable, bandwidth-sensitive rate to an archival repository 16, as discussed in greater detail below. As used herein, a "real-time interactive flow" refers to an interactive media flow and/or an interactive data flow between or among two or more endpoints. An interactive media flow constituting a real-time interactive flow may comprise a real-time audio stream and/or a real-time video stream or other real-time media or data stream. As non-limiting examples, the real-time interactive flow may include a Web Real-Time Communications (WebRTC) interactive flow and/or an interactive flow according to a control protocol such as Session Initiation Protocol (SIP) or H.323.

For purposes of illustration, the real-time interactive flow 14 in FIG. 1 is shown as passing between computing devices 18 and 20. It is to be understood that the computing devices 18 and 20 may both be located within the same public or private network, or may be located within separate, communicatively coupled public or private networks. Some embodiments of the interactive communications system 10 of FIG. 1 may provide that each of the computing devices 18 and 20 may be any computing device having network communications capabilities, such as a smartphone, a tablet computer, a dedicated web appliance, a media server, a desktop or server computer, or a purpose-built communications device, as non-limiting examples.

The computing devices 18 and 20 of FIG. 1 comprise interactive flow clients 22 and 24, respectively. Each of the interactive flow clients 22 and 24 may be a web browser application, a dedicated communications application, or an interface-less application such as a daemon or service application, as non-limiting examples. In some embodiments, the interactive flow clients 22 and 24 comprise WebRTC clients and/or clients operating according to control protocols such as SIP or H.323. As seen in FIG. 1, the interactive flow clients 22 and 24 further comprise interactive flow functionality providers 26 and 28, respectively. The interactive flow functionality providers 26 and 28 implement the protocols, codecs, and Application Programming Interfaces (APIs) necessary to enable real-time interactive sessions between the computing devices 18 and 20.

The archival streaming agent 12 of FIG. 1 is provided to archive the real-time interactive flow 14 in a bandwidth-sensitive manner. In some embodiments, the archival streaming agent 12 is implemented as an extension or plug-in for the interactive flow client 22 for receiving and processing packets received by the interactive flow client 22. In some embodiments, the archival streaming agent 12 may be integrated into the interactive flow functionality provider 26.

As seen in FIG. 1, the interactive flow functionality provider 26 receives the real-time interactive flow 14, and forks the real-time interactive flow 14 to the archival streaming agent 12 as an archival stream 30. The archival stream 30, which is a duplicate of the content of the real-time interactive flow 14, is then streamed by the archival streaming agent 12 to the archival repository 16 at an adjustable streaming rate. In some embodiments, the archival stream 30 comprises a plurality of network packets, which the archival streaming agent 12 may mark as having a low priority. The archival repository 16 may be one or more computing devices configured to provide persistent storage of data received as part of the archival stream 30.

As the archival stream 30 is being streamed to the archival repository 16, the archival streaming agent 12 measures changes in performance characteristics of the real-time interactive flow 14. As non-limiting examples, the archival streaming agent 12 may measure performance characteristics such as available network bandwidth, data throughput, latency, jitter, and/or error rates for the real-time interactive flow 14. In some embodiments, the archival streaming agent 12 may measure changes in performance characteristics of the real-time interactive flow 14 based on real-time interactive flow performance data (not shown) received from the computing device 18. Some embodiments may provide that the archival streaming agent 12 measures changes in performance characteristics based on performance information communicated to the interactive flow client 22 in the form of protocol messages such as RTP Control Protocol (RTCP) messages.

In some embodiments, the archival streaming agent 12 may measure changes in performance characteristics of the real-time interactive flow 14 by analyzing the network packets constituting the real-time interactive flow 14. If a change in a performance characteristic of the real-time interactive flow 14 is detected, the archival streaming agent 12 may modify the adjustable streaming rate at which the archival stream 30 is being streamed to the archival repository 16 based on the change. For example, if the archival streaming agent 12 measures a degradation in data throughput of the real-time interactive flow 14, the archival streaming agent 12 may decrease the streaming rate of the archival stream 30 to minimize any impact that the archival stream 30 may have on the real-time interactive flow 14.

Modifying the adjustable streaming rate of the archival stream 30 by the archival streaming agent 12 to minimize any impact on the real-time interactive flow 14 may result in the archival stream 30 being streamed to the archival repository 16 at a rate that is less than real-time. Accordingly, some embodiments of the archival streaming agent 12 may provide buffering of the archival stream 30 prior to and/or concurrently with streaming the archival stream 30 to the archival repository 16. In this manner, the archival streaming agent 12 may ensure that a complete archive of the real-time interactive flow 14 is recorded, while remaining appropriately sensitive to network conditions.

The archival streaming agent 12 may also measure changes in network utilization by the computing device 18, and modify the adjustable streaming rate accordingly based on any such changes. In some embodiments, the archival streaming agent 12 may measure changes in network utilization based on network utilization data provided by the computing device 18. For instance, the computing device 18 may provide the archival streaming agent 12 with data relating to current utilization of a download and/or upload capacity of the computing device 18.

While exchanging video, audio, and/or data of the real-time interactive flow 14, users may also share other types of data (e.g., documents, emails, or images) in conjunction with the real-time interactive flow 14. Because streaming of the archival stream 30 may not occur in real-time, it may be desirable to associate the data shared during the real-time interactive flow 14 with specific points in time in the archival stream 30. Accordingly, the archival streaming agent 12 may provide an archival timeline stream 32 that is associated with the archival stream 30, and that is streamed concurrently with the archival stream 30 to the archival repository 16. In some embodiments, the archival timeline stream 32 may be incorporated into the archival stream 30. In this manner, the archival timeline stream 32 may provide a link between data shared during the real-time interactive flow 14 and a corresponding point in time in the archival stream 30.

To illustrate bandwidth-sensitive archiving of an interactive flow passing across an enterprise network, FIG. 2 is provided. FIG. 2 shows an exemplary interactive communications system 34 including an archival streaming agent 36. The archival streaming agent 36 provides a point at which a real-time interactive flow 38 may be streamed at an adjustable, bandwidth-sensitive rate to an archival repository 40. For purposes of illustration, the real-time interactive flow 38 in FIG. 2 is shown as passing between a computing device 42 within an enterprise network 44 and a computing device 46 external to the enterprise network 44. Some embodiments of the interactive communications system 34 of FIG. 2 may provide that each of the computing devices 42 and 46 may be any computing device having network communications capabilities, such as a smartphone, a tablet computer, a dedicated web appliance, a media server, a desktop or server computer, or a purpose-built communications device, as non-limiting examples.

The computing devices 42 and 46 of FIG. 2 comprise interactive flow clients 48 and 50, respectively. Each of the interactive flow clients 48 and 50 may be a web browser application, a dedicated communications application, or an interface-less application such as a daemon or service application, as non-limiting examples. In some embodiments, the interactive flow clients 48 and 50 comprise WebRTC clients and/or clients operating according to control protocols such as SIP or H.323. As seen in FIG. 2, the interactive flow clients 48 and 50 further comprise interactive flow functionality providers 52 and 54, respectively. The interactive flow functionality providers 52 and 54 implement the protocols, codecs, and Application Programming Interfaces (APIs) necessary to enable real-time interactive sessions between the computing devices 42 and 46.

In the example of FIG. 2, the interactive flow client 48 of the computing device 42 has established the real-time interactive flow 38 with the interactive flow client 50 of the computing device 46 via a secure peer connection 56. It is to be understood that the processes by which the secure peer connection 56 is established may vary according to the type of interactive flow (e.g., WebRTC, SIP, or H.323, among others) being established. Once the secure peer connection 56 is established, the video, audio, and/or data streams that make up the real-time interactive flow 38 pass between the computing device 42 and the computing device 46 in an encrypted format.

As noted above, the interactive communications system 34 includes the enterprise network 44 providing networked computing and communications resources to users within an enterprise. As used herein, an "enterprise" refers to any organization for the purpose of a business venture or other organized activity, private or public. The enterprise network 44 includes an enterprise "demilitarized zone" (DMZ) 58 to secure the enterprise network 44 while permitting both enterprise users and external users access to enterprise resources (not shown) within the enterprise DMZ 58. The enterprise DMZ 58 may include a DMZ policy enforcement point 60. The DMZ policy enforcement point 60 filters or alters network traffic passing through the enterprise DMZ 58 in accordance with enterprise policies. It is to be understood that the enterprise DMZ 58 may include additional elements not illustrated in FIG. 2.

In the example of FIG. 2, the enterprise network 44, of which the computing device 42 is a part, operates under an enterprise policy that dictates that all real-time interactive flows 38 passing into and/or out of the enterprise network 44 must be recorded for security, legal, and/or archival purposes. This enterprise policy may be applied at the DMZ policy enforcement point 60, but only where the network traffic constituting the real-time interactive flow 38 is unencrypted and passes through the DMZ policy enforcement point 60. If both of those conditions are met, the DMZ policy enforcement point 60 may fork a copy of the real-time interactive flow 38 for archiving, or may otherwise ensure that the real-time interactive flow 38 is recorded. However, if either of these conditions is not met, it may be impractical or impossible to apply the enterprise policy at the DMZ policy enforcement point 60. For example, the network traffic constituting the real-time interactive flow 38 may be encrypted, and thus, inaccessible to the DMZ policy enforcement point 60, or the endpoints of the real-time interactive flow 38 may be located such that the real-time interactive flow 38 does not pass through the DMZ policy enforcement point 60.

In FIG. 2, the real-time interactive flow 38 is streamed over the secure peer connection 56 as it passes through the DMZ policy enforcement point 60. Thus, the network traffic constituting the real-time interactive flow 38 is encrypted, and cannot be forked for archiving at the DMZ policy enforcement point 60. Moreover, while it may be possible for the interactive flow functionality provider 52 to fork and archive the real-time interactive flow 38, the interactive flow functionality provider 52 may not be able to do so in a bandwidth-sensitive manner to maintain the real-time interactive flow 38.

In this regard, the archival streaming agent 36 of FIG. 2 is provided. In some embodiments, the archival streaming agent 36 is implemented as an extension or plug-in for the interactive flow client 48 for receiving and processing packets received by the interactive flow client 48. In some embodiments, the archival streaming agent 36 may be integrated into the interactive flow functionality provider 52.

The interactive flow functionality provider 52 receives the real-time interactive flow 38, and forks the contents of the real-time interactive flow 38 to the archival streaming agent 36 as an archival stream 62. The archival stream 62, which is a duplicate of the contents of the real-time interactive flow 38, is then streamed over the enterprise network 44 by the archival streaming agent 36 to the archival repository 40 at an adjustable streaming rate. As discussed above with respect to FIG. 1, the archival streaming agent 36 may also provide an archival timeline stream 64 that is associated with the archival stream 62, and that is streamed concurrently with the archival stream 62 to the archival repository 40. The archival repository 40 may be one or more computing devices that is accessible via the enterprise network 44, and that is configured to provide persistent storage of data received as part of the archival stream 62.

As the archival stream 62 is being streamed to the archival repository 40, the archival streaming agent 36 measures changes in performance characteristics of the real-time interactive flow 38. As non-limiting examples, the archival streaming agent 36 may measure performance characteristics such as available network bandwidth, data throughput, latency, jitter, and/or error rates of the real-time interactive flow 38. If a change in a performance characteristic of the real-time interactive flow 38 is detected, the archival streaming agent 36 may modify the adjustable streaming rate at which the archival stream 62 is being streamed to the archival repository 40 based on the change. The archival streaming agent 36 may also measure changes in network utilization by the computing device 42, and modify the adjustable streaming rate accordingly based on any such changes.

Some embodiments may provide that an archival streaming agent is integrated into a network media server to which two or more endpoints connect to participate in a real-time interactive flow. In this regard, FIG. 3 illustrates an exemplary interactive communications system 66 including a computing device 68 providing a media server 70 for distributing real-time interactive flows 72(1)-72(N) among a plurality of computing devices 74(1)-74(N). In particular, the media server 70 in this example includes an archival streaming agent 76 to stream a duplicate of the contents of the real-time interactive flows 72 to an archival repository 78 at an adjustable, bandwidth-sensitive rate. The media server 70 further comprises an interactive flow functionality provider 80 for mixing, switching, transcoding, or otherwise acting on and distributing the real-time interactive flows 72. The archival streaming agent 76 may be implemented as an extension of or plug-in for the media server 70. In some embodiments, the archival streaming agent 76 may be integrated into the interactive flow functionality provider 80.

As non-limiting examples, the media server 70 in some embodiments may be a conference server, a contact center server, or a media control unit (MCU), as non-limiting examples.

In this example, each of the computing devices 74(1)-74(N) connects to the media server 70 of the computing device 68. The computing devices 68 and 74 may communicate via a public network, such as the Internet, and/or via one or more private networks. The computing devices 68 and 74 of FIG. 3 may be any computing device having network communications capabilities, such as a smartphone, a tablet computer, a dedicated web appliance, a media server, a desktop or server computer, or a purpose-built communications device, as non-limiting examples. The computing devices 74(1)-74(N) respectively comprise interactive flow clients 84(1)-84(N). Each of the interactive flow clients 84 may be a web browser application, a dedicated communications application, or an interface-less application, such as a daemon or service application, as non-limiting examples. In some embodiments, the interactive flow clients 84 comprise WebRTC clients and/or clients operating according to control protocols such as SIP or H.323. As seen in FIG. 3, the interactive flow clients 84(1)-84(N) further comprise interactive flow functionality providers 86(1)-86(N), respectively. The interactive flow functionality providers 86 implement the protocols, codecs, and Application Programming Interfaces (APIs) (e.g., the protocols for WebRTC or SIP) necessary to enable real-time interactive sessions among the computing devices 74 providing the interactive flow functionality providers 86.

The interactive flow functionality provider 80 receives the real-time interactive flows 72, and forks the contents or a mix of the contents of the real-time interactive flows 72 to the archival streaming agent 76 as an archival stream 88. The archival stream 88, which is a duplicate of the contents or the mix of contents of the real-time interactive flows 72, is then streamed by the archival streaming agent 76 to the archival repository 78 at an adjustable streaming rate. As discussed above with respect to FIG. 1, the archival streaming agent 76 may also provide an archival timeline stream 90 that is associated with the archival stream 88, and that is streamed concurrently with the archival stream 88 to the archival repository 78. The archival repository 78 may be one or more computing devices that are accessible via a public network and/or a private network, and that is configured to provide persistent storage of data received as part of the archival stream 88.

As the archival stream 88 is being streamed to the archival repository 78, the archival streaming agent 76 measures changes in performance characteristics of the real-time interactive flows 72. As non-limiting examples, the archival streaming agent 76 may measure performance characteristics such as available network bandwidth, data throughput, latency, jitter, and/or error rates of the real-time interactive flows 72. If a change in a performance characteristic of the real-time interactive flows 72 is detected, the archival streaming agent 76 may modify the adjustable streaming rate at which the archival stream 88 is being streamed to the archival repository 78 based on the change. The archival streaming agent 76 may also measure changes in network utilization by the computing device 68, and modify the adjustable streaming rate accordingly based on any such changes.

Figure 4:
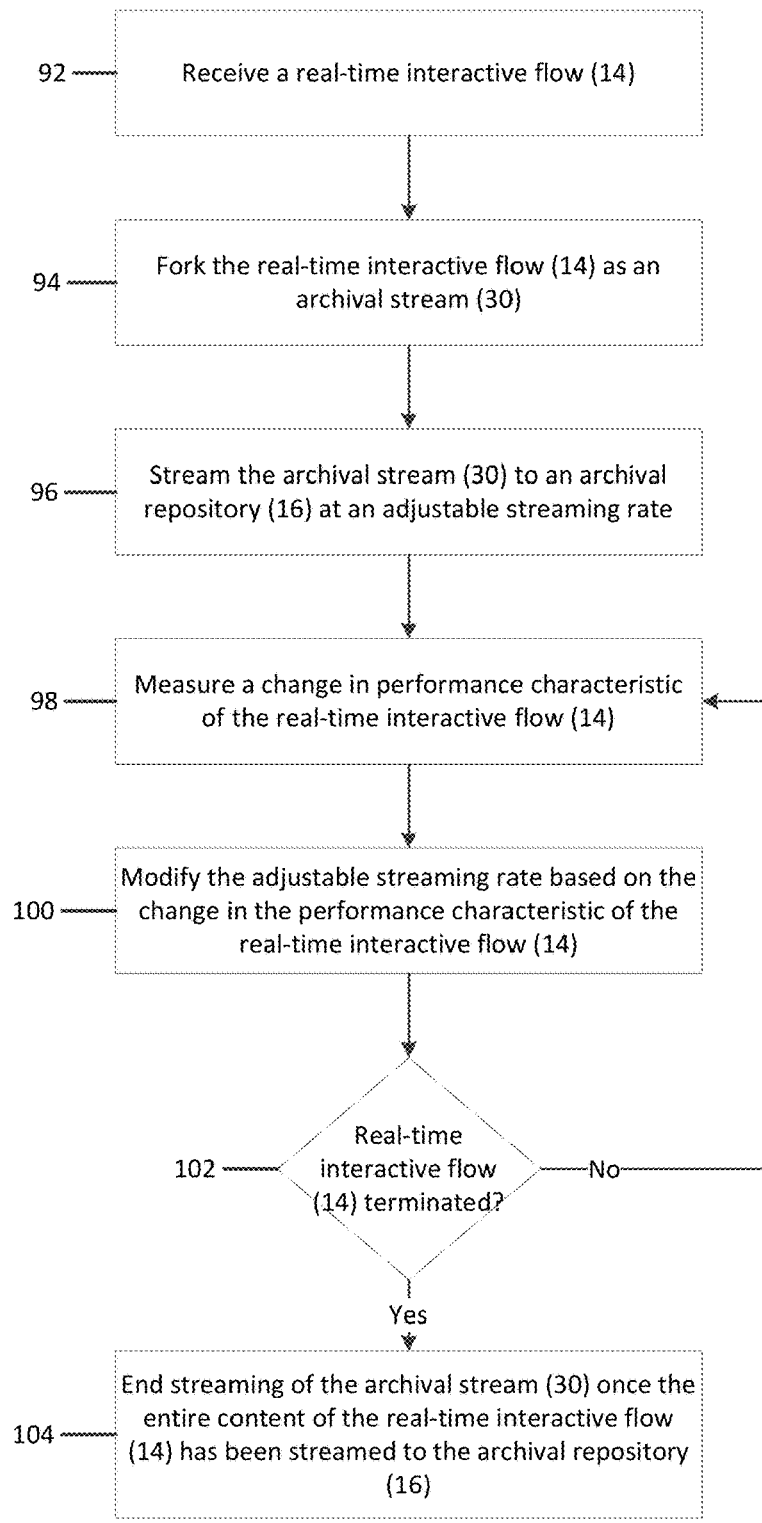
FIG. 4 is a flowchart illustrating exemplary operations of the archival streaming agent of FIG. 1 for bandwidth-efficient archiving of real-time interactive flows.

To generally describe exemplary operations of the archival streaming agent 12 of FIG. 1 for providing bandwidth-efficient archiving of the real-time interactive flow 14, FIG. 4 is provided. For the sake of clarity, elements of FIG. 1 are referenced in describing FIG. 4. In the example of FIG. 4, operations begin with the interactive flow functionality provider 26 receiving the real-time interactive flow 14 (block 92). In some embodiments, the real-time interactive flow 14 may comprise a WebRTC interactive flow and/or an interactive flow according to a control protocol such as Session Initiation Protocol (SIP) or H.323, as non-limiting examples.

With continuing reference to FIG. 4, the interactive flow functionality provider 26 next forks the real-time interactive flow 14 as the archival stream 30 to the archival streaming agent 12 (block 94). The archival stream 30 is a duplicate of the content of the real-time interactive flow 14. The archival streaming agent 12 streams the archival stream 30 to the archival repository 16 at an adjustable streaming rate (block 96). As noted above, the archival repository 16 may be one or more computing devices that is accessible via a public or private network, and that is configured to provide persistent storage of data received as part of the archival stream 30.

The archival streaming agent 12 next measures a change in a performance characteristic of the real-time interactive flow 14 (block 98). The performance characteristic of the real-time interactive flow 14 may include a network bandwidth, a data throughput, a latency, a jitter level, and/or an error rate of the real-time interactive flow 14. Based on the change in the performance characteristic of the real-time interactive flow 14, the archival streaming agent 12 modifies the adjustable streaming rate of the archival stream 30 (block 100). By modifying the adjustable streaming rate of the archival stream 30 based on the change in the performance characteristic, the archival streaming agent 12 minimizes any impact on the real-time interactive flow 14 while still providing a complete archive of the real-time interactive flow 14.

The archival streaming agent 12 then determines whether the real-time interactive flow 14 has terminated (block 102). If not, processing returns to block 98 of FIG. 4, where a change in a performance characteristic of the real-time interactive flow 14 is again measured. If the real-time interactive flow 14 has terminated, the archival streaming agent 12 ends streaming of the archival stream 30 once the entire content of the real-time interactive flow 14 has been streamed to the archival repository 16 (block 104).

Figure 5A:
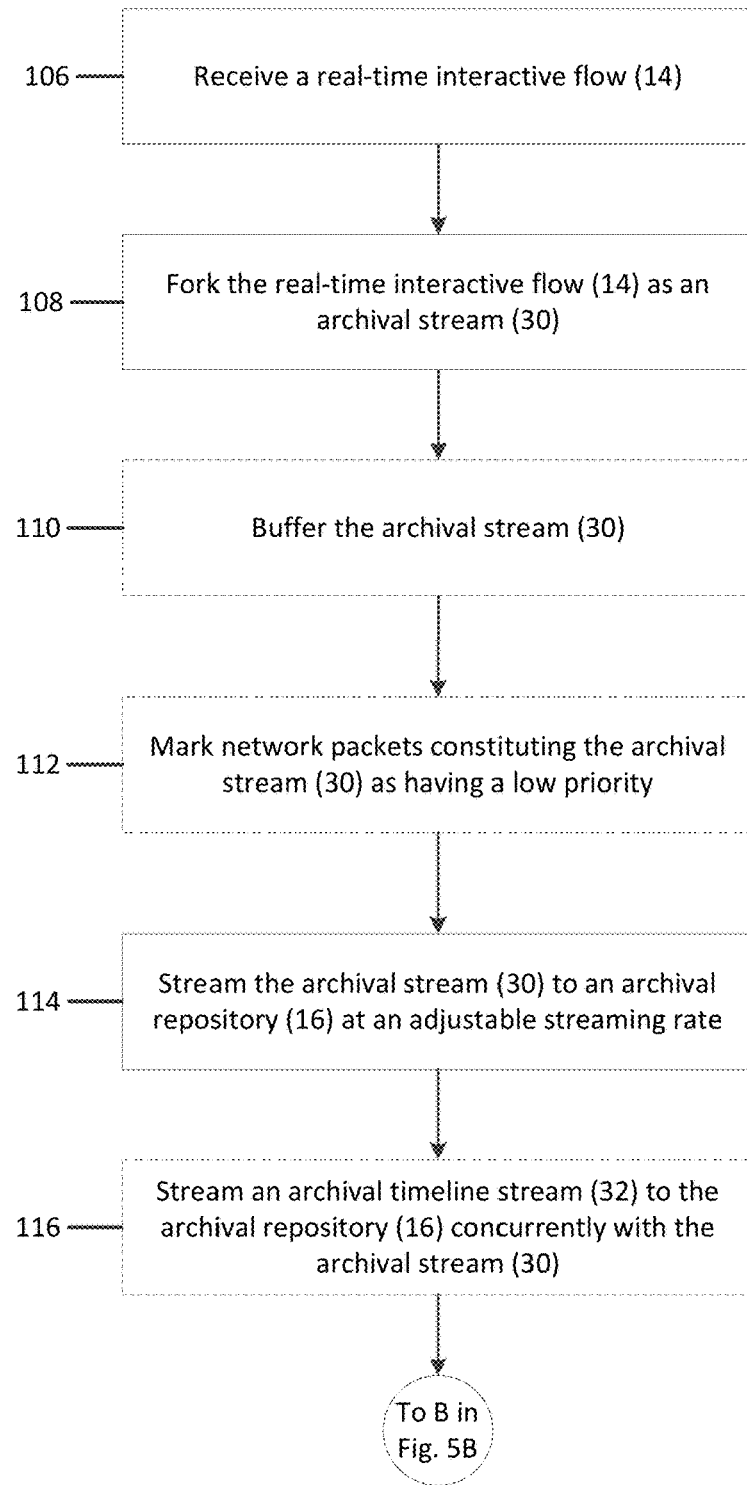
FIGS. 5A and 5B are flowcharts illustrating more detailed exemplary operations for real-time interactive flow archiving, including adjusting a streaming rate of an archival stream in response to changes in interactive flow performance and/or network bandwidth.
Figure 5B:
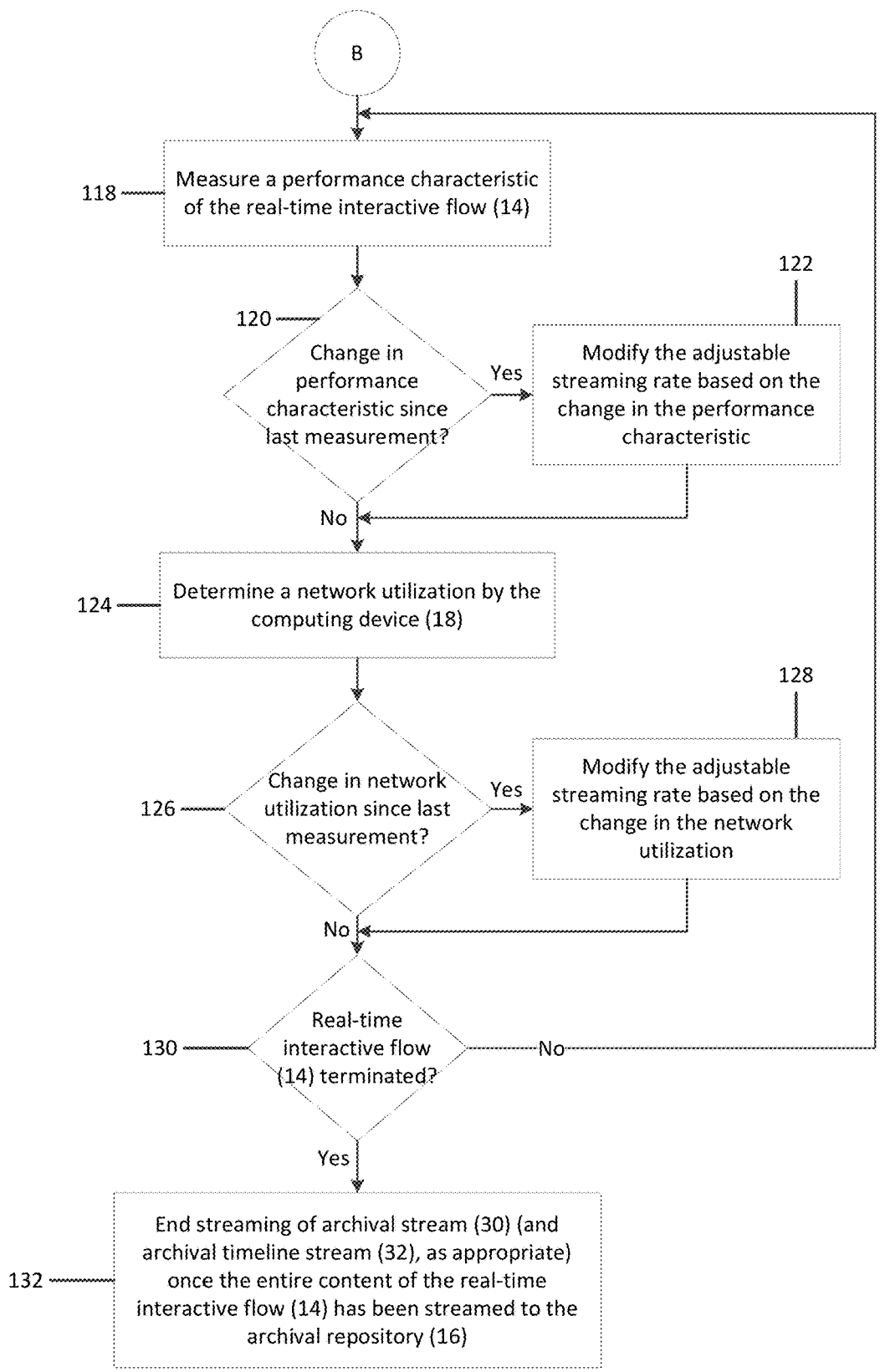

FIGS. 5A and 5B are provided to illustrate in greater detail an exemplary generalized process for the archival streaming agent 12 of FIG. 1 to archive a real-time interactive flow 14 in a bandwidth-efficient manner. For illustrative purposes, FIGS. 5A and 5B refer to elements of the interactive communications system 10 and the archival streaming agent 12 of FIG. 1. FIG. 5A details operations for forking the real-time interactive flow 14, and streaming the archival stream 30 to the archival repository 16. FIG. 5B shows operations for adjusting a streaming rate of the archival stream 30.

Referring now to FIG. 5A, the interactive flow functionality provider 26 first receives the real-time interactive flow 14 (block 106). In some embodiments, the real-time interactive flow 14 may comprise a WebRTC interactive flow and/or an interactive flow according to a control protocol such as Session Initiation Protocol (SIP) or H.323, as non-limiting examples. The interactive flow functionality provider 26 next forks the real-time interactive flow 14 as the archival stream 30 to the archival streaming agent 12 (block 108). The archival stream 30 is a duplicate of the content of the real-time interactive flow 14.

In some embodiments, the archival streaming agent 12 optionally may buffer the archival stream 30 before or concurrently with beginning to stream the archival stream 30 (block 110). By buffering the archival stream 30, the archival streaming agent 12 may ensure that a complete copy of the real-time interactive flow 14 can be made even if network conditions require the archival stream 30 to be streamed at a rate less than real-time. The archival streaming agent 12 may also optionally mark network packets constituting the archival stream 30 as having a low priority (block 112). In some embodiments, this minimizes any impact of the archival stream 30 on other, higher priority network traffic.

The archival streaming agent 12 then streams the archival stream 30 to an archival repository 16 at an adjustable streaming rate (block 114). The archival repository 16 may be one or more computing devices that is accessible via a public or private network, and that is configured to provide persistent storage of data received as part of the archival stream 30. As discussed in greater detail below, streaming the archival stream 30 at an adjustable streaming rate permits the archival streaming agent 12 to modify the streaming rate in response to changes in performance characteristics of the real-time interactive flow 14 and/or changes in network utilization by a computing device.

In some embodiments, users may share other types of data (e.g., documents, emails, and/or images) outside the real-time interactive flow 14 while exchanging video, audio, and/or data of the real-time interactive flow 14. Because streaming of the archival stream 30 may not occur in real-time, it may be desirable in such embodiments to associate the data shared during the real-time interactive flow 14 with specific points in time in the archival stream 30. Accordingly, the archival streaming agent 12 may optionally stream an archival timeline stream 32 to the archival repository 16 concurrently with the archival stream 30 (block 116). Processing then continues at block 118 of FIG. 5B.

Referring now to FIG. 5B, the archival streaming agent 12 measures a performance characteristic of the real-time interactive flow 14 (block 118). The performance characteristic of the real-time interactive flow 14 may include a network bandwidth, a data throughput, a latency, a jitter level, and/or an error rate of the real-time interactive flow 14. The archival streaming agent 12 determines whether there has been a change in the measured performance characteristic since a last measurement of the performance characteristic (block 120). If a change in the measurement of the performance characteristic is detected at decision block 120, the archival streaming agent 12 modifies the adjustable streaming rate of the archival stream 30 based on the change in the measurement of the performance characteristic (block 122). As a non-limiting example, if the archival streaming agent 12 detects a decrease in data throughput of the real-time interactive flow 14, the archival streaming agent 12 may decrease the adjustable streaming rate of the archival stream 30 to minimize impact on the real-time interactive flow 14. Processing then resumes at block 124. If no change in the measurement of the performance characteristic is detected at decision block 120, processing continues to block 124 of FIG. 5B.

The archival streaming agent 12 next determines a network utilization by the computing device 18 (block 124). Some embodiments may provide that the archival streaming agent 12 may determine network utilization based on network utilization data provided by the computing device 18. The archival streaming agent 12 then determines whether there has been a change in the network utilization since a last determination of the network utilization (block 126). If a change in the network utilization by the computing device 18 is detected at decision block 126, the archival streaming agent 12 modifies the adjustable streaming rate of the archival stream 30 based on the change in the network utilization (block 128). As a non-limiting example, if the archival streaming agent 12 detects an increase in network utilization by the computing device 18, the archival streaming agent 12 may decrease the adjustable streaming rate of the archival stream 30 to minimize network burden. Processing then resumes at block 130. If no change in the measurement of the network utilization is detected at decision block 126, processing continues to block 130 of FIG. 5B.

The archival streaming agent 12 next determines whether the real-time interactive flow 14 has terminated (block 130). If not, processing resumes at block 118 of FIG. 5B. If the real-time interactive flow 14 has terminated, the archival streaming agent 12 ends streaming of the archival stream 30 and, if appropriate, the archival timeline stream 32, once the entire content of the real-time interactive flow 14 has been streamed to the archival repository 16 (block 132).

Figure 6:
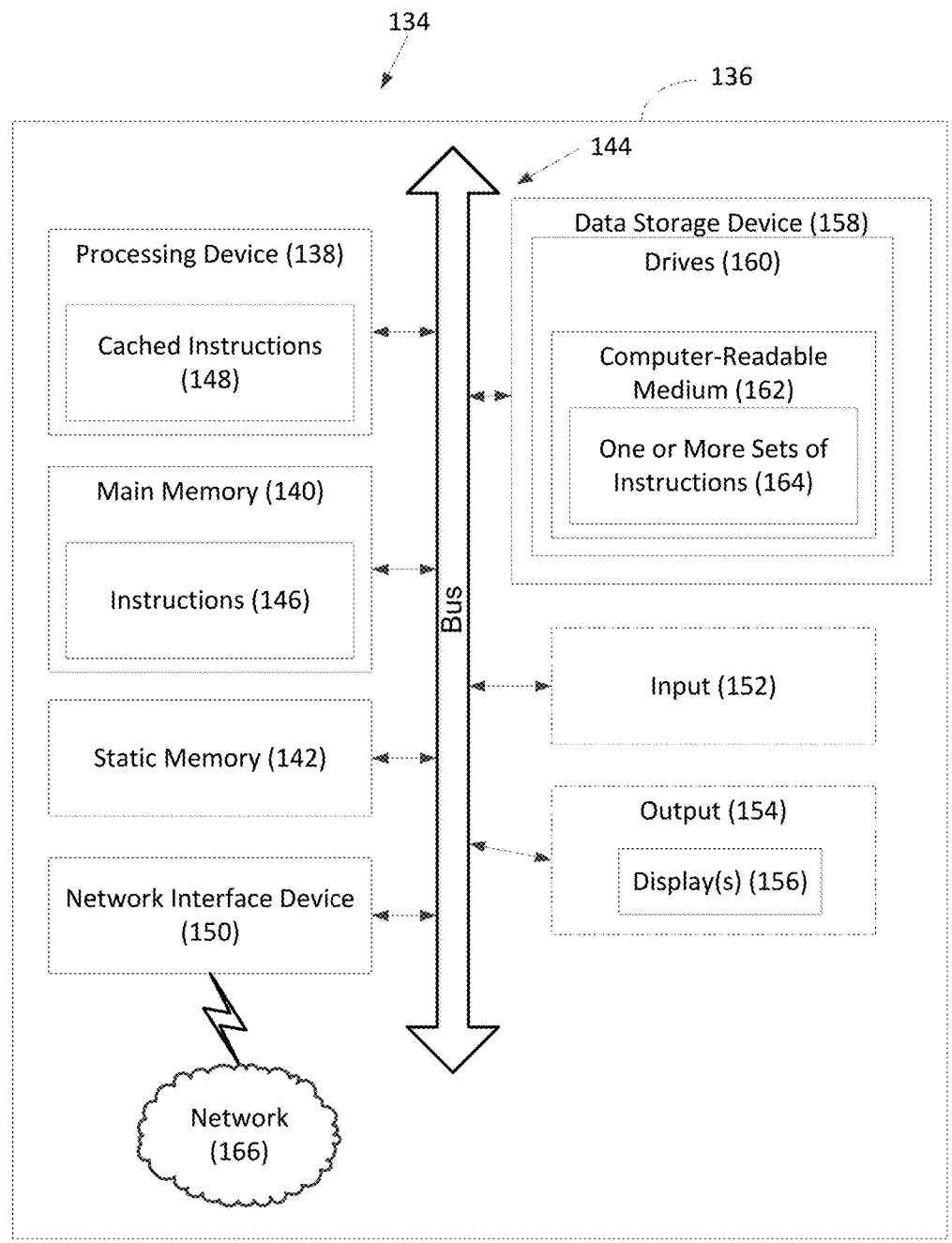
FIG. 6 is a block diagram of an exemplary processor-based system that may include the archival streaming agent of FIG. 1.

FIG. 6 provides a schematic diagram representation of a processing system 134 in the exemplary form of an exemplary computing device 136 adapted to execute instructions to perform the functions described herein. In some embodiments, the processing system 134 may execute instructions to perform the functions of the archival streaming agent 12 of FIG. 1. In this regard, the processing system 134 may comprise the computing device 136, within which a set of instructions for causing the processing system 134 to perform any one or more of the methodologies discussed herein may be executed. The processing system 134 may be connected (as a non-limiting example, networked) to other machines in a local area network (LAN), an intranet, an extranet, or the Internet. The processing system 134 may operate in a client-server network environment, or as a peer machine in a peer-to-peer (or distributed) network environment. While only a single processing system 134 is illustrated, the terms "controller" and "server" shall also be taken to include any collection of machines that individually or jointly execute a set (or multiple sets) of instructions to perform any one or more of the methodologies discussed herein. The processing system 134 and/or the computing device 136 may comprise a server, a personal computer, a desktop computer, a laptop computer, a personal digital assistant (PDA), a computing pad, a mobile device, a purpose-built communications device, and/or any other device and may represent, as non-limiting examples, a server or a user's computer.

The exemplary computing device 136 includes a processing device or processor 138, a main memory 140 (as non-limiting examples, read-only memory (ROM), flash memory, dynamic random access memory (DRAM) such as synchronous DRAM (SDRAM), etc.), and a static memory 142 (as non-limiting examples, flash memory, static random access memory (SRAM), etc.), which may communicate with each other via a bus 144. Alternatively, the processing device 138 may be connected to the main memory 140 and/or the static memory 142 directly or via some other connectivity means.

The processing device 138 represents one or more processing devices, such as a microprocessor, central processing unit (CPU), or the like. More particularly, the processing device 138 may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The processing device 138 is configured to execute processing logic in instructions 146 and/or cached instructions 148 for performing the operations and steps discussed herein.

The computing device 136 may further include a communications interface in the form of a network interface device 150. It also may or may not include an input 152 to receive input and selections to be communicated to the computing device 136 when executing the instructions 146, 148. It also may or may not include an output 154, including but not limited to display(s) 156. The display(s) 156 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computing device 136 may or may not include a data storage device 158 that includes using drive(s) 160 to store the functions described herein in a computer-readable medium 162, on which is stored one or more sets of instructions 164 (e.g., software) embodying any one or more of the methodologies or functions described herein. The functions can include the methods and/or other functions of the processing system 134, a participant user device, and/or a licensing server, as non-limiting examples. The one or more sets of instructions 164 may also reside, completely or at least partially, within the main memory 140 and/or within the processing device 138 during execution thereof by the computing device 136. The main memory 140 and the processing device 138 also constitute machine-accessible storage media. The instructions 146, 148, and/or 164 may further be transmitted or received over a network 166 via the network interface device 150. The network 166 may be an intra-network or an inter-network.

While the computer-readable medium 162 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 164. The term "machine-accessible storage medium" shall also be taken to include any medium that is capable of storing, encoding, or carrying a set of instructions 146, 148, and/or 164 for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for archiving a real-time interactive flow, comprising:
   receiving, by a computing device, a real-time interactive flow comprising a plurality of network packets from each of a plurality of endpoints engaged in an interactive communication session, the plurality of network packets exchanged point to point in real-time between the plurality of endpoints, wherein the computing device comprises one of the endpoints engaged in the interactive session;
   forking the real-time interactive flow at the computing device as an archival stream based on a policy applied by a policy enforcement point of an enterprise network, the policy dictating that the real-time interactive flows passing into or out of the enterprise network be recorded when the interactive flow is unencrypted and the archival stream comprising a plurality of network packets duplicating the plurality of network packets of the real-time interactive flow;
   streaming the archival stream from the computing device to an archival repository at an adjustable streaming rate during the real-time interactive flow;
   streaming an archival timeline stream concurrently with streaming the archival stream, wherein the archival timeline stream comprises a stream of data associating data in the archival stream with points in time along a timeline;
   measuring a change in a performance characteristic of the real-time interactive flow, the measuring comprising analyzing the plurality of network packets of the real-time interactive flow; and
   modifying the adjustable streaming rate based on the change in the performance characteristic of the real-time interactive flow.

2. The method of claim 1, further comprising buffering the archival stream by the computing device.

3. The method of claim 1, wherein streaming the archival stream to the archival repository comprises marking the plurality of network packets of the archival stream as having a low priority.

4. The method of claim 1, further comprising:
   measuring a change in a network utilization by the computing device; and
   modifying the adjustable streaming rate based on the change in the network utilization.

5. The method of claim 4, wherein measuring the change in the network utilization is based on network utilization data provided by the computing device.

6. The method of claim 1, wherein measuring the change in the performance characteristic of the real-time interactive flow comprises receiving real-time interactive flow performance data from the computing device.

7. The method of claim 6, wherein the real-time interactive flow performance data comprises RTP Control Protocol (RTCP) messages.

8. The method of claim 1, wherein the real-time interactive flow comprises an exchange of audio and/or video data between the plurality of endpoints in the interactive communication session, and wherein the endpoints further exchange types of data other than audio and/or video data during the interactive communication session.

9. The method of claim 1, wherein the real-time interactive flow is selected from the group consisting of a Web Real-Time Communications (WebRTC) interactive flow, a Session Initiation Protocol (SIP) interactive flow, and an H.323 interactive flow.

10. A system for archiving a real-time interactive flow, comprising:
    at least one communications interface;
        an archival repository associated with the at least one communications interface; and
        a computing device associated with the at least one communications interface and comprising an interactive flow functionality provider and an archival streaming agent, the interactive flow functionality provider configured to:
            receive a real-time interactive flow comprising a plurality of network packets from each of a plurality of endpoints engaged in an interactive communication session, the plurality of network packets exchanged point to point in real-time between the plurality of endpoints, wherein the computing device comprises one of the endpoints engaged in the interactive session; and
            fork the real-time interactive flow to the archival streaming agent as an archival stream based on a policy applied by a policy enforcement point of an enterprise network, the policy dictating that real-time interactive flows passing into or out of the enterprise network be recorded when the interactive flow is unencrypted and the archival stream comprising a plurality of network packets duplicating the plurality of network packets of the real-time interactive flow; and
        the archival streaming agent configured to:
            stream the archival stream to the archival repository at an adjustable streaming rate during the real-time interactive flow;
            stream an archival timeline stream concurrently with streaming the archival stream, wherein the archival timeline stream comprises a stream of data associating data in the archival stream with points in time along a timeline;

measure a change in a performance characteristic of the real-time interactive flow, the measuring comprising analyzing the plurality of network packets of the real-time interactive flow; and modify the adjustable streaming rate based on the change in the performance characteristic of the real-time interactive flow.

11. The system of claim 10, wherein the archival streaming agent is further configured to buffer the archival stream.

12. The system of claim 10, wherein the archival streaming agent is configured to stream the archival stream by marking the plurality of network packets of the archival stream as having a low priority.

13. The system of claim 10, wherein the archival streaming agent is further configured to:
measure a change in a network utilization by the computing device; and
modify the adjustable streaming rate based on the change in the network utilization.

14. The system of claim 10, wherein the archival streaming agent is configured to measure the change in the performance characteristic of the real-time interactive flow by receiving real-time interactive flow performance data from the computing device.

15. The system of claim 10, wherein the real-time interactive flow comprises an exchange of audio and/or video data between the plurality of endpoints in the interactive communication session, and wherein the endpoints further exchange types of data other than audio and/or video data during the interactive communication session.

16. A non-transitory computer-readable medium having stored thereon computer-executable instructions to cause a processor to implement a method, comprising:
receiving, by a computing device, a real-time interactive flow comprising a plurality of network packets from each of a plurality of endpoints engaged in an interactive communication session, the plurality of network packets exchanged point to point in real-time between the plurality of endpoints, wherein the real-time interactive flow comprises an exchange of audio and/or video data between the plurality of endpoints in the interactive communication session, wherein the endpoints further exchange types of data other than audio and/or video data during the interactive communication session, and wherein the computing device comprises one of the endpoints engaged in the interactive session;
forking the real-time interactive flow at the computing device as an archival stream based on a policy applied by a policy enforcement point of an enterprise network, the policy dictating that real-time interactive flows passing into or out of the enterprise network be recorded when the interactive flow is unencrypted and the archival stream comprising a plurality of network packets duplicating the plurality of network packets of the real-time interactive flow;
streaming the archival stream from the computing device to an archival repository at an adjustable streaming rate during the real-time interactive flow;
streaming an archival timeline stream concurrently with streaming the archival stream, wherein the archival timeline stream comprises a stream of data associating data in the archival stream with points in time along a timeline;
measuring a change in a performance characteristic of the real-time interactive flow, the measuring comprising analyzing the plurality of network packets of the real-time interactive flow; and
modifying the adjustable streaming rate based on the change in the performance characteristic of the real-time interactive flow.

17. The non-transitory computer-readable medium of claim 16 having stored thereon the computer-executable instructions to cause the processor to implement the method, further comprising buffering the archival stream.

18. The non-transitory computer-readable medium of claim 16 having stored thereon the computer-executable instructions to cause the processor to implement the method, further comprising:
measuring a change in a network utilization by the computing device; and
modifying the adjustable streaming rate based on the change in the network utilization.

19. The non-transitory computer-readable medium of claim 16 having stored thereon the computer-executable instructions to cause the processor to implement the method, wherein measuring the change in the performance characteristic of the real-time interactive flow comprises receiving real-time interactive flow performance data from the computing device.

20. The method of claim 1, wherein analyzing the plurality of network packets of the real-time interactive flow comprises measuring one of the group consisting of a data throughput of the real-time interactive flow, a latency of the real-time interactive flow, a jitter level of the real-time interactive flow, and an error rate of the real-time interactive flow.

* * * * *